United States Patent [19]
Virog, Jr.

[11] 4,348,167
[45] Sep. 7, 1982

[54] BOTTOM ASSIST PRE-BLOW SYSTEM FOR BLOW MOLDING MACHINES

[76] Inventor: John J. Virog, Jr., 7502 San Ardo Dr., Buena Park, Calif. 90621

[21] Appl. No.: 228,098

[22] Filed: Jan. 26, 1981

[51] Int. Cl.³ .................. B29C 17/07; B05B 15/08; B05B 15/10
[52] U.S. Cl. ........................ 425/522; 239/288; 239/288.3; 239/288.5; 239/587; 264/529; 425/530; 425/532; 425/537
[58] Field of Search .......... 425/522, 530, 532, 537; 264/529, 540, 573; 239/587, 288, 288.3, 288.5

[56] References Cited

U.S. PATENT DOCUMENTS

| Re. 25,290 | 12/1962 | Parfrey | 425/532 X |
| 3,091,803 | 6/1963 | Scott, Jr. et al. | 425/532 X |
| 3,115,673 | 12/1963 | Rudolph | 264/540 X |
| 3,789,093 | 1/1974 | Bose | 264/540 X |
| 4,027,433 | 6/1977 | Hockett | 239/587 X |

Primary Examiner—Jan H. Silbaugh
Attorney, Agent, or Firm—Edgar W. Averill, Jr.

[57] ABSTRACT

A device for improving the control of the shape of a parison of a blow molding machine. The device has an inner nozzle positioned below the lowermost level of the parison and directed upwardly toward the open end of the parison. The device may be adapted to pivot so that a deflector plate is moved below the finished part.

7 Claims, 7 Drawing Figures

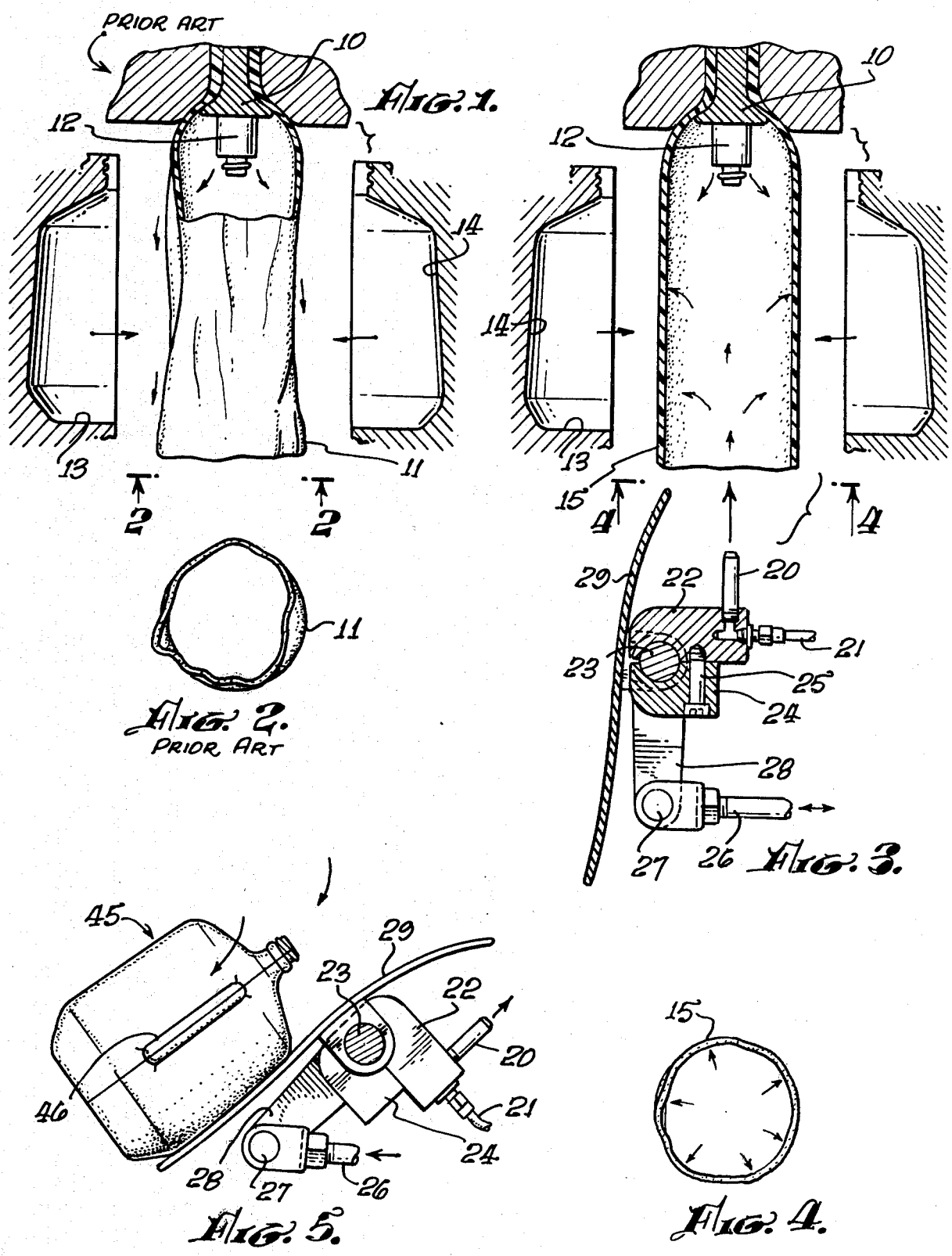

BOTTOM ASSIST PRE-BLOW SYSTEM FOR BLOW MOLDING MACHINES

BACKGROUND OF THE DISCLOSURE

The field of the invention is plastic part fabricating machines, and the invention relates more specifically to blow molding machines. Such machines are commonly used to fabricate various hollow shapes and especially bottles. In blow molding, a tube or parison is formed by an extruder and as the tube moves downwardly to its lowermost position, two mold halves are moved toward one another and against the extruded parison. After the mold halves have closed, air is injected through the upper end of the parison to force the parison against the inner walls of the mold.

In order to reduce weight and decrease costs, there is a desire to make thin-walled, light-weight articles. For some applications, such as milk bottles, it is also desired to form a handle as a portion of the bottle to permit carrying the bottle with one hand and to facilitate pouring. Because of the thin wall thickness, the parison often does not maintain its shape and occasionally the handle will not be completely formed and a defective bottle results.

In order to help maintain the shape of the parison, air is often blown outwardly against the upper edge of the parison. This air infringes against the parison near the mandrel and then moves downwardly and out at the lower edge of the parison. For thin-walled containers of relatively small inside diameters such as one-gallon bottles, this downward flow of air may actually have an adverse effect on parison shape because of the Bernoulli effect. The rapid flow of air along the inner surface of the parison as it extends downwardly decreases the pressure along the inside surface of the lower part of the parison. Ironically, the greater the flow of air inside the parison, the more the sides of the parison tend to move together at the lower portion.

It has been known to blow air upwardly into large heavy wall industrial containers or large containers using large tooling. The usual steps taken to try to solve this problem included increasing air flow at the top of the parison and aiming the air flow upwardly and outwardly. Such steps were only partially effective and a better system is needed.

Another problem with high volume blow molding operations is the amount of operator time required to make adjustments to keep the parison straight. One operator is typically needed for two machines.

A further problem exists when the extrusion pressure reduces near the end of the extrusion cycle referred to as "shot pressure tail off." It is the latter part of the extrusion which determines the configuration of the portion of the container including the handle and thus "shot pressure tail off" has an adverse effect on container quality. This is especially true when the polymer used exhibits a substantially lower amount of die swell. This problem is also particularly acute for one-half gallon and one gallon single service containers. Another problem is referred to as "tail folds" which results when the lower portion of the parison folds inwardly. When a folded parison is moved outwardly against the mold, a fold is formed in the molded part resulting in a reject.

SUMMARY OF THE INVENTION

It is thus an object of the present invention to provide an apparatus and a method for improving the quality of blow molded plastic parts.

It is another object of the present invention to provide a device for improving parison shape and to provide more uniform wall thickness.

The present invention is for a device for improving the control of the shape of a parison of a blow molding machine. The device comprises an air nozzle positioned below the lowermost level of the parison and directed upwardly toward the lower end of the parison. The upward air flow slightly increases the air pressure within the parison and decreases the tendency of the parison to become out of round. Preferably, control valve means are provided to limit the flow of air out of the nozzle to the period of time the parison is being extruded from the die of the blow molding machine. In a preferred embodiment, the nozzle is located near the extremity of the pivot arm and the arm is positioned so that the nozzle is directly under the parison when the arm is in its first position. A deflector plate is also attached to the pivot shaft and when the pivot shaft is moved to its second position, the deflector plate is moved below the parison so that the finished part falls upon the deflector plate and is directed toward an inspection station. A plurality of nozzles may be positioned on one pivot arm. The air pressure should be between 20 psi and 60 psi and preferably about 35 psi.

BRIEF DESCRIPTION OF THE DRAWINGS

FIG. 1 is a schematic cross-sectional view of a blow molding machine showing the prior art method of extruding a parison.

FIG. 2 is a view taken along line 2—2 of FIG. 1.

FIG. 3 is a schematic cross-sectional view similar to FIG. 1, but including the pre-blow system of the present invention.

FIG. 4 is a view taken along line 4—4 of FIG. 3.

FIG. 5 is a schematic cross-sectional view similar to the lower portion of FIG. 3 with the air nozzle and deflector plate pivoted to a second position.

DESCRIPTION OF THE PREFERRED EMBODIMENTS

Figure 6:
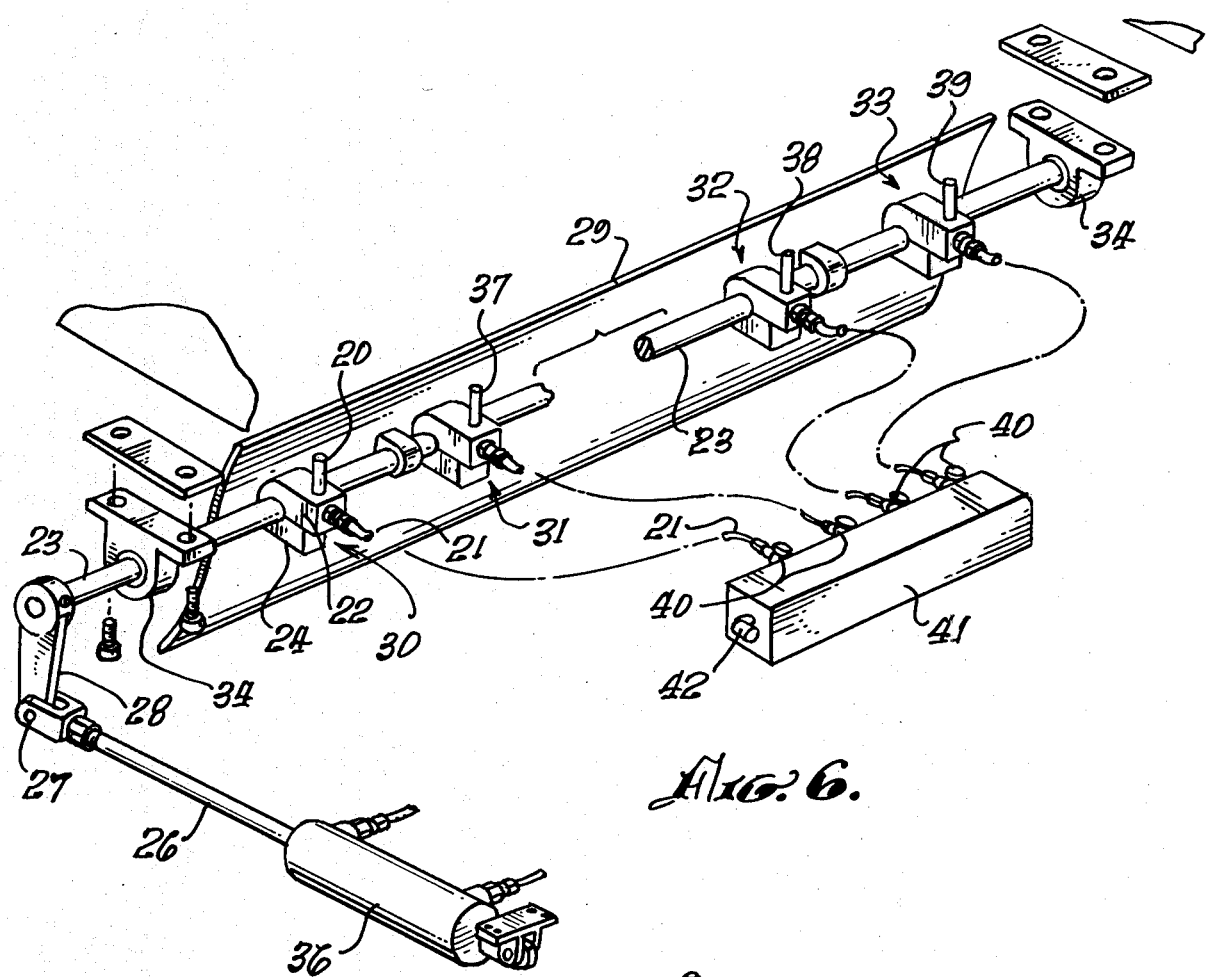
FIG. 6 is an exploded perspective view showing the major components of the present invention.
Figure 7:
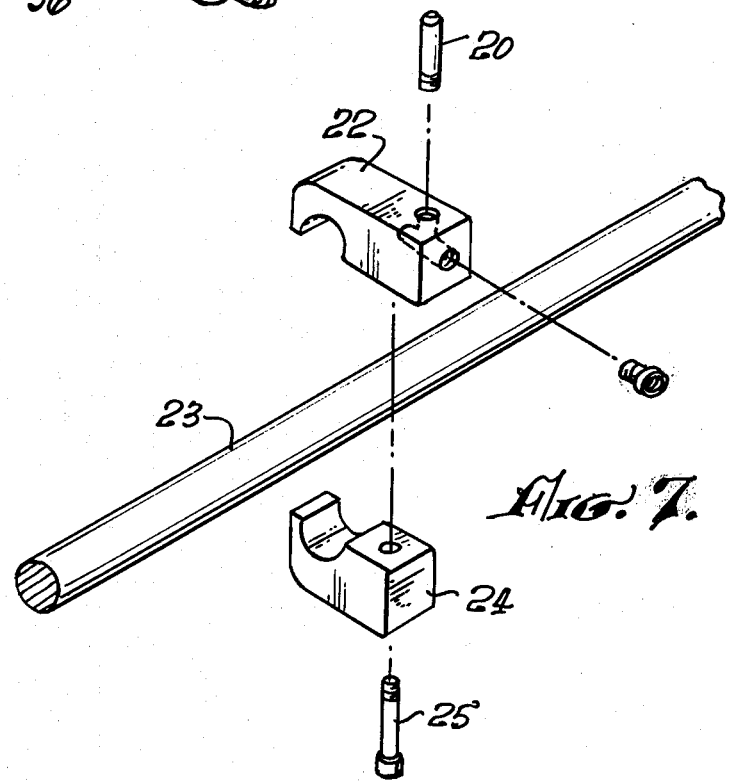
FIG. 7 is an enlarged exploded view of the nozzle bracket portions and fittings of the present invention.

The extruder of a blow molding machine is shown in FIG. 1 together with the two mold halves. The extruder has a center mandrel 10, the position of which determines, in part, the wall thickness of the parison. The parison is indicated by reference character 11. An air outlet nozzle or blow pin 12 is positioned axially aligned in the middle of the extruder head and serves to fill the parison with air after mold halves 13 and 14 have closed together.

As stated above, in the fabrication of light-weight one gallon milk bottles and other single service and industrial light-weight containers, the wall thickness of the parison 11 is not sufficient to maintain the integrity of the cylindrical shape. A certain amount of sagging occurs as shown in FIG. 1 and this can affect the shape of the final product and particularly affect the handle portion of bottles having an integral handle.

The parison shape is shown in FIG. 2 which is taken along line 2—2 of FIG. 1. As shown there, the parison does not have a smooth cylindrical shape but instead is irregular in shape which can affect handle definition and can even lead to a fold in the parison which results in a rejected part or wasted material.

While not wishing to be bound by any theory, it is believed that one cause of the irregular shape results from air flow along the inner surface of the parison. This air flow reduces the pressure on the inner surface of the lower portion of a parison. This effect is illustrated in FIG. 1 of the drawings where air outlet nozzle 12 directs air upwardly and outwardly against the parison. The air, having nowhere else to go, must then flow downwardly and out of the lower end of the parison. This air flow in a parison of relatively small cross section such as a one gallon thin-walled container causes an inward movement of the walls of the parison as shown in FIG. 1.

It is believed that the upward air flow of the device of the present invention is effective to overcome the Bernoulli effect and to straighten and extend the parison to its desired shape.

The device of the present invention is shown in FIG. 3 where the identical extruder mandrel 10 produces a parison 15 which is almost a perfect cylinder as shown in FIG. 4. The same mold halves 13 and 14 surround parison 15 and the air outlet nozzle 12 is the same as shown in FIG. 1.

The bottom pre-blow system has a nozzle 20 which is supplied with air line 21 both of which are threaded into pivot arm upper half 22. Pivot arm upper half 22 is held to shaft 23 by the clamping action formed between it and lower pivot half 24. Bolt 25 is threaded into pivot arm upper half 22. Pivot shaft 23 is caused to move from its first position as shown in FIG. 3 to its second or deflecting position shown in FIG. 5 by the longitudinal movement of arm 26. Arm 26 is affixed through bearing 27 to member 28 which is attached to shaft 23. A deflector plate 29 is also affixed to pivot shaft 23 and moves from its first position shown in FIG. 3 to its second position shown in FIG. 5 as arm 26 moves outwardly as shown.

As shown in FIG. 6 a plurality of pivot carriages 30 through 33 are shown attached to pivot shaft 23 and each assembly is identical to the assembly shown in FIG. 3 and described above. Shaft 23 is supported by a pair of pillow blocks 34 and 35 and air cylinder 36 controls the position of shaft 23.

Air is supplied to the nozzles which are indicated by reference characters 20, 37, 38 and 39 and a plurality of valves 40 are affixed to a common manifold 41 which provides a flow of air to each of the nozzles.

The timing of the air supplied to manifold 41 may be programmed into the automatic cycle of the blow molding machine so that the bottom assist pre-blow is individually controlled for each parison. The air is supplied from the air supply to the machine through a solenoid valve not shown which is connected to an air line which in turn is connected to inlet 42 positioned at the end of manifold 41.

A bottle 45 is shown just after it has been ejected from mold halves 13 and 14. As it falls downwardly, it hits deflector plate 29 which guides it toward a cooling conveyor which takes it to a deflashing and inspection station prior to being placed in the finished goods inventory.

The integral handle 46 is shown in FIG. 5 and it is this area that usually causes the greatest number of rejects resulting from imperfect parison shape. The movement of the deflector plate 29 may be timed by programming it into the automatic cycle of the machine. The flexible air lines 21 permit movement of the pivot carriages to allow the deflector plate to be moved from its first position to its second position.

Excellent results have occurred from the use of an air nozzle having an inside diameter of $\frac{1}{4}$ to $\frac{3}{8}$ inches which is fed through a $\frac{1}{8}$ inch air line connected to the manifold. A manifold pressure of about 20 psi to 60 psi and preferably about 35 psi is suggested.

It is also preferred that the air flow through the nozzles be limited to the period of time the parison is being extruded from the die and this can be programmed in with the automatic cycle of the machine. The deflector plate and its action in conjunction with the bottom assist pre-blow forms an important part of the present invention. Since the bottle just after leaving the mold is relatively fragile, it is important that it be guided away from the pre-blow nozzle to avoid damage to the bottle. It also is important to provide air line protection from hot plastic.

For high production uses such as the forming of milk bottles, two through five and eight head units are common, and the device of the present invention can readily be automated and adapted to such machines.

It is believed that the present invention is effective by increasing the pressure in the interior of the parison a slight amount but not enough to distort the parison outwardly. This slight pressure differential urges the parison outwardly and tends to form the desired cylindrical shape shown in FIG. 4. This same result cannot be obtained by merely increasing air flow at the top of the parison.

The present embodiments of this invention are thus to be considered in all respects as illustrative and not restrictive; the scope of the invention being indicated by the appended claims rather than by the foregoing description. All changes which come within the meaning and range of equivalency of the claims therefore are intended to be embraced therein.

What is claimed is:

1. A device for use in a blow molding machine for improving the control of the shape of a parison positioned into a mold of the blow molding machine, said device comprising:

an air nozzle attached to a pivot carriage which in turn is attached to a pivot shaft moveable between a first and second position, said air nozzle being located at a position near the extremity of the pivot carriage, said pivot carriage thus also being moveable between a first and second position so that the nozzle is positionable directly under a parison when the carriage is in a first position and is moved away from below a parison when the arm is in its second position when a finished part is ejected from the mold; and a deflector plate attached to said pivot shaft, said deflector plate being positioned so that when the pivot carriage is moved from its first position to its second position, the deflector plate is moved into the location formerly occupied by the nozzle so that when a finished part would be ejected from the mold of the blow molding machine, it would strike the deflector plate rather than the nozzle.

2. The device of claim 1 further including control valve means to limit the flow of air out of said nozzle to a pre-determined segment of time.

3. The device of claim 1 wherein there is a plurality of said nozzles.

4. The device of claim 3 wherein said nozzles are fed from a common manifold.

5. The device of claim 1 wherein the air pressure provided to the nozzle is from 20 PSI to 60 PSI.

6. The device of claim 1 wherein the air pressure supplied to the nozzle is about 35 PSI.

7. The device of claim 5 wherein the inside diameter of the nozzle is from $\frac{1}{4}$ to $\frac{3}{8}$ inch.

* * * * *